United States Patent [19]

Isoard

[11] 4,088,010
[45] May 9, 1978

[54] METHOD AND APPARATUS FOR DETECTING THE PRESENCE OF YARNS

[75] Inventor: Bernard Isoard, Ecully, France
[73] Assignee: Rhone-Poulenc-Textile, Paris, France
[21] Appl. No.: 755,591
[22] Filed: Dec. 30, 1976

Related U.S. Application Data

[62] Division of Ser. No. 559,534, Mar. 18, 1975, Pat. No. 4,023,399.

[30] Foreign Application Priority Data

Mar. 22, 1974 France .................................. 74 10430

[51] Int. Cl.² ...................... G01B 13/00; B65H 63/02
[52] U.S. Cl. ................................................... 73/37.7
[58] Field of Search ...................... 73/37.7, 37.6, 37.5, 73/37, 160; 242/37 R, 54 R, 57

[56] References Cited

U.S. PATENT DOCUMENTS

| | | | |
|---|---|---|---|
| 3,271,997 | 9/1966 | Horne et al. | 73/37.7 |
| 3,635,413 | 1/1972 | Gish | 242/54 R |
| 3,769,475 | 10/1973 | Czwakiel | 73/37.7 X |

Primary Examiner—Richard C. Queisser
Assistant Examiner—Joseph W. Roskos
Attorney, Agent, or Firm—Sherman & Shalloway

[57] ABSTRACT

A method and apparatus for sensing the presence or absence of yarns using a simple airflow in an open slot formed between parallel plates, the pressure upstream of the proper yarn path being sensed. In one form, the pressure is sensed at multiple points and averaged to accommodate yarn oscillation.

4 Claims, 4 Drawing Figures

METHOD AND APPARATUS FOR DETECTING THE PRESENCE OF YARNS

This is a division of application Ser. No. 559,534, filed Mar. 18, 1975, now U.S. Pat. No. 4,023,399.

BACKGROUND OF THE INVENTION

The present invention relates to a method and apparatus of sensing the presence or absence of yarns in yarn-handling installations to signal proper operation thereof or misoperations such as yarn breakage or deflection or disruption of the normal path of the yarn.

BRIEF DESCRIPTION OF THE PRIOR ART

In the present-day handling of yarns at high speeds, it is important to be able to detect misoperations as soon as they occur. One means for checking on the proper operation of textile machinery and yarn handling equipment is that of employing detection equipment associated with the site of the yarn, during proper operation of the process and equipment, and which is capable of signalling the absence of the yarn from its proper site upon breakage or excessive diversion of the yarn upon misoperation.

Prior detection means employing mechanical or positive engagement sensors have been employed with yarns of sufficient tensile strength and where the tension they imposed would not be detrimental to the yarn handling operation with which they were associated. With the present high linear-speeds at which yarns are handled, such positive engagement sensors have proven unsuitable for low tensile strength yarns and in operations in which yarn tension is important to the operation.

Prior attempts also have been made in detecting the presence and absence of yarns without actual engagement of the yarn. These have included photoelectric or optical sensors, capacitance sensors and pneumatic sensors.

Optical and electrical sensors have the disadvantage of being delicate and of requiring large amounts of space and, consequently, are limited in their ease of location.

Pneumatic sensors have been found to be more rugged and have improved versatility in their location in the yarn handling installation.

German Offenlegungschrift No. 2,108,108, for example, discloses a pneumatic sensor which employs the "Auger" effect to sense the presence of a yarn in its chamber. The chamber surrounds the yarn which is passed between two closely spaced walls. A flow of gas is passed into the narrow chamber via multiple nozzles which produce spaced jets which then mingle to form the gas flow stream. A pressure sensor is located in the zone between the individual jets and is sensitive the aspirating effect of the spaced jets, so that disturbance of the normal flow of the jets is reflected in a varying aspirating effect. With this system, the yarn, in its proper position, imposes an effect on the system, which is then used as the reference point or normal value. Loss of proper yarn position, or an absence of yarn due to breakage, affects the dual jets or the downstream, joint flow of fluid and, therefore, the aspirating effect of the jets. The pressure sensor then signals the variance from normal conditions.

The sensor of German OS No. 2,108,108 is an improvement over earlier forms of detectors, but exhibits several disadvantages of its own. In particular, these sensors require exact location, orientation and machining of the nozzles and the pressure-sensor pickup. Further, they require an impact wall on the opposite side of the yarn path and thereby require encirclement of the yarn and a very narrow range of tolerance in the yarn path within the detection chamber. This extreme sensitivity in the yarn path is especially detrimental if it is desired to employ a sensor in a location in which oscillation of the yarn is normally to be found.

Where said oscillation of the yarn is normal in the yarn-handling installations, the prior non-engagement yarn detectors have been limited regarding the versatility of their location. The need for a uniform position of the yarns, or a yarn path of very slight tolerance, forces either the use of such detectors only at locations at which the yarn runs true between stations or, alternatively, the stabilization of the yarn by means of positive-engagment guides, which dampen or preclude the oscillations and consequently defeat the purpose of the non-engaging sensors.

Also, where such non-engaging sensors actually encircle the yarn with solid structure, such as occurs in German OLS No. 2,108,108, it is necessary either to hinge a portion of the structure or otherwise make a portion removable or, alternatively, to thread the yarn through the encircling structure.

Therefore, the prior yarn detectors have not been found to be entirely satisfactory.

SUMMARY OF THE INVENTION

In general, the preferred method of yarn detection comprises the passage of the yarn between closely spaced, parallel walls out of contact therewith, passing a stream of gas against the yarn between the parallel walls, and sensing the pressure in the zone between the walls and upstream from the yarn path. Preferably, the gas flow is substantially perpendicular to the yarn path.

The preferred form of sensor comprises a pair of generally flat walls adjacent and substantially parallel to each other, the spacing between the parallel walls being at least equal to the diameter of the yarn to be sensed to define a yarn path therebetween, means for supplying a flow of gas between the walls and against the yarn path, and a pressure sensor in communication between the walls adjacent and upstream of the yarn path.

OBJECTS OF THE INVENTION

It is an object of the present invention to provide a simple and reliable yarn-presence sensor which is rugged and is versatile in location in yarn-handling installations.

It is a further object of the present invention to provide a yarn-presence sensor which is simple in design and construction and reliable in performance in a variety of positions, conditions and locations in a yarn-handling installation.

It is a further object of the present invention to provide a yarn-presence sensor which is simple in design, construction, cost, and in ease and cost of operation.

It is a further object of the present invention to provide a yarn-presence sensor which is simple in design, construction, and costs and which is not limited to use only in locations in which the yarn is running true and without substantial oscillation.

It is a still further object of the present invention to provide a simple and reliable, economical yarn-presence sensor which will accommodate relatively wide yarn paths to permit installation of the sensor in zones of yarn-handling installations in which oscillation of the yarn, on substantially one plane, is proper in the normal operation of the yarn-handling installations.

BRIEF DESCRIPTION OF THE DRAWINGS

These and other objects of the invention and a better understanding thereof may be derived from the following description and the accompanying drawings, in which.

DESCRIPTION OF THE PREFERRED EMBODIMENT

Figure 1:
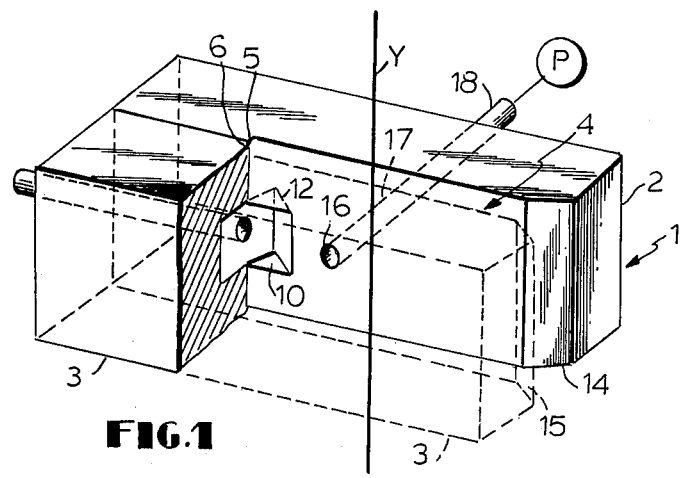
FIG. 1 is an isometric view, partly cut away, of the preferred form of sensor of the invention.
Figure 2:
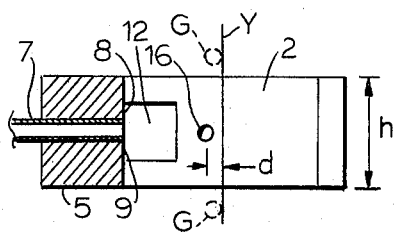
FIG. 2 is a sectional side view of the sensor of FIG. 1.
Figure 3:
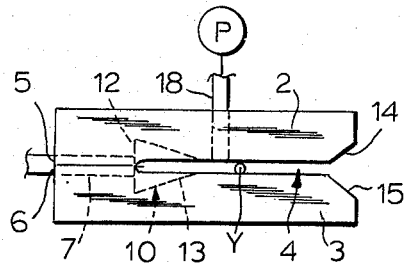
FIG. 3 is a plan view of the sensor of FIG. 1.

As shown in FIGS. 1 to 3, the preferred embodiment of the present invention comprises a sensor 1 including a pair of substantially flat plates 2 and 3 which are spaced from and parallel to each other to form a narrow slot 4.

Preferably, the width of the slot 4 is established by a pair of projections 5 and 6 each formed at one end of the plates 2 and 3, respectively. The width of the slot 4 is at least equal to and, most advantageously, substantially in excess of the diameter of the thickest yarns to be sensed. Preferably, the width of the slot 4 is at least 2 times the diameter of the thickest yarn to be handled and not more than 50 times the diameter of the smallest yarn to be handled.

The slot 4 receives single, unidirectional stream of flowing fluid, such as compressed air from a suitable source (not shown) through a duct 7 which extends through the adjacent surfaces of the projections 5 and 6 and terminates, at the inner edges 8 and 9 thereof, at a dovetail-shaped distribution chamber 10.

The distribution chamber is formed by opposite, tapering recesses 12 and 13, respectively, formed in the plates 2 and 3. The recesses 12 and 13 are deepest adjacent their respective inner edges 8 and 9 and taper to meet the planar surfaces forming the slot a short distance from those inner edges.

The slot 4 is substantially unconfined to the escape of the flowing gas along its direction of flow from the duct 7, the axis of which preferably is at or near the vertical midpoint of the plates 2 and 3.

The edges of the plates 2 and 3 preferably are chamfered, as shown at 14 and 15, to facilitate the entry of yarns and re-entry of broken or new yarns without disassembly or adjustment of the sensor.

One of the plates 2 and 3 has a pressure sensing aperture 16 and a bore 17 communicating therethrough and open to the slot 4. The bore 17 is connected via a duct 18 with a suitable pressure sensor and evaluator, shown schematically at "P." The pressure sensor P may be, for example, a fluidic amplifier with suitable relay means for providing electrical or other signals.

The positioning of the aperture 16, with regard to the axis of fluid flow through the duct 7, is important. Most advantageously, the center of aperture 16 is substantially aligned with the axis of the duct 7, or closely adjacent thereto, to provide a full response to the presence or absence of a yarn within the slot 4.

Also, the location of the pressure-sensing aperture is to be upstream from the "normal" yarn path or position, indicated at "Y." Preferably, the distance "d" between the yarn or yarn path "Y" and the adjacent edge of the aperture 16 is between 1mm and 10mm, the larger dimension being more suitable for accommodating yarn oscillation unless the point "Y" is the nearest point of travel of the yarn. Preferably, the axis of gas flow from the duct 7 toward the yarn path is substantially perpendicular to a yarn in the normal path, or to the average position of the yarn if it is oscillating within the yarn path, so that the yarn provides its maximum potential obstruction to the flow of air, and a consequent maximum of effect on the upstream pressure.

OPERATION OF THE PREFERRED EMBODIMENT

In operation, the sensor may be mounted, by any suitable means (not shown) at any convenient position, in a yarn-handling installation, in which the yarn path coincides with the designed yarn path. Where oscillation of the yarn is present, the plane of oscillation is to be substantially parallel to the flat surfaces of the plates 2 and 3 to avoid contact therewith.

It is also convenient to install the sensor on a stable yarn path intermediate two existing yarn guides, if they are available and as represented in dotted lines "G" in FIG. 2. However, it is to be understood that such yarn guides are not a prerequisite for the sensor of the present invention.

The operation and advantages of the new sensor may most conveniently be understood by means of an example of a sensor which has proven to operate successfully and reliably with average count yarns, such as 50 to 300 dtex, with the following dimensions and conditions:

plate height ($h$) = 20mm;

distance between aperture 6 and the yarn Y ($d$) = 0 to 10mm;

width of slot 4 = 0.2 to 1mm;

absolute pressure of air supply = about 1.1 bar; and at yarn speeds in excess of 6000 and 7000 m/min.

When a yarn is present in its proper path within the slot 4, the slight obstruction it presents to the airflow from the duct 7 causes a higher pressure at the pressure sensing aperture 16 than would be found if the yarn were not present to form the sole obstruction to the airflow.

Therefore, with suitable calibration of the pressure sensor P, in accordance with its type, the sensor unit 1 and the pressure sensor P can be arranged to immediately signal the loss of normal yarn passage and provoke or impose a shutdown of that portion of the installation. Re-establishment of the correct yarn passage is then possible, after correction of the operating fault or breakage, by simple lateral introduction of the yarn via chamfers 14 and 15.

DESCRIPTION OF A MODIFIED EMBODIMENT

Figure 4:
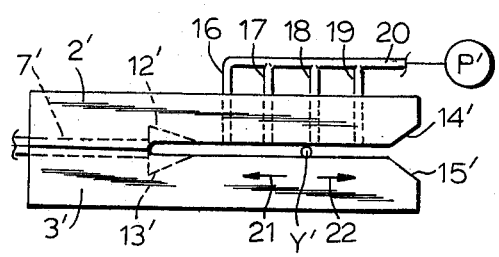
FIG. 4 is a plan view, similar to FIG. 3, of a modified form of the invention.

A modified form of the invention is shown in FIG. 4, in which the same numerals, primed, are used to identify elements in common with those of FIGS. 1–3. The sensor of FIG. 4 includes, in addition to the aperture 16', a plurality of apertures 17, 18, and 19 which are similarly aligned along the airflow path and which communicate with the sensor P' via a common manifold 20, which also serves the aperture 16'.

OPERATION OF THE MODIFIED EMBODIMENT

In use, the form of sensor disclosed in FIG. 4 is capable of accommodating a considerable amplitude of osciallation of the yarn from its average or basic path Y', in the directions indicated by the arrows 21 and 22, again parallel to the planar surfaces of the plates in order to maintain non-engagement with the yarn.

The multiple pressure-sensing apertures 16' through 19 supply an average pressure reading, via the common manifold 20, to the sensor and evaluator P'. Therefore, as long as a yarn is present in the zone defined by the multiple apertures, it will impose a higher pressure on the aperture or apertures between itself and the duct 7' than would be present if the yarn departed its normal path of passage. The sensor P' is then capable of signaling the presence or absence of the yarn.

Therefore, it is apparent that the present invention provides a particularly advantageous method and apparatus for detecting the presence or absence of a yarn, without the need for positive engagement with the yarn.

The sensors of the present invention are compact, rugged and reliable and, therefore, are quite easily installed at convenient locations in a yarn-handling installation.

Furthermore, the sensors of the present invention are reliable under conditions of yarn oscillation, without affecting yarn tension and, therefore, may be employed in circumstances and locations in which prior sensors were unsuitable. Therefore, the sensing of the present invention may be accomplished by installation in a wide variety of locations in drawing, spinning, winding, or any yarn-handling installation, regardless of the type, size, or physical or chemical characteristics of the yarns.

The sensors may be employed alone or, if desired, may be associated with other equipment, such as the yarn-driving nozzle disclosed in French application No. 73/44,960, filed Dec. 13, 1973, in the name of the assignee of the present application.

Various changes may be made in the details of the invention as disclosed without sacrificing the advantages thereof or departing from the scope of the appended claims.

I claim:

1. The method for detecting the presence of a traveling yarn comprising
    (a) confining a traveling yarn in a narrow zone between parallel plane walls which are able to accommodate oscillations in the path of travel of the yarn, in a plane parallel to and between the parallel plane walls, without contacting the yarn,
    (b) supplying an unidirectional flow of gas to said narrow zone and against said yarn, and
    (c) monitoring the pressure in said narrow zone intermediate said yarn and said gas supply, whereby when the yarn is present in said narrow zone the pressure is higher than when the yarn is not present to form the sole obstruction to the gas flow.

2. The method of claim 1 in which the flow of gas is directed substantially perpendicular to said yarn.

3. The method of claim 1, wherein the narrow zone between parallel plane walls is open on three sides to permit escape of the unidirectional flow of gas in the direction of travel of the yarn as well as transverse to the direction of travel of the yarn.

4. The method of claim 1, wherein the distance between the parallel plane walls is at least two times the diameter of the yarn.

* * * * *